(12) United States Patent
Sehrer

(10) Patent No.: US 8,983,868 B1
(45) Date of Patent: Mar. 17, 2015

(54) USING LOCATION INFORMATION IN ELECTRONIC COMMERCE

(71) Applicant: Google Inc., Mountain View, CA (US)

(72) Inventor: Trevor Sehrer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/790,445

(22) Filed: Mar. 8, 2013

(51) Int. Cl.
*G06Q 10/00* (2012.01)
*G06Q 20/32* (2012.01)
*G06Q 30/02* (2012.01)
*G06Q 50/00* (2012.01)
*G06Q 30/00* (2012.01)

(52) U.S. Cl.
CPC ........ *G06Q 20/3224* (2013.01); *G06Q 30/0261* (2013.01); *G06Q 50/01* (2013.01); *G06Q 30/0218* (2013.01); *G06Q 30/00* (2013.01); *G06Q 20/32* (2013.01); *G06Q 30/0224* (2013.01); *G06Q 30/0269* (2013.01); *G06Q 20/322* (2013.01); *G06Q 20/3223* (2013.01)
USPC ............................................. 705/44; 705/1.1

(58) Field of Classification Search
CPC ... G06Q 50/01; G06Q 20/32; G06Q 30/0224; G06Q 30/0269; G06Q 30/0261; G06Q 20/3223; G06Q 30/0218; G06Q 20/322; G06Q 30/00
See application file for complete search history.

(56) References Cited

U.S. PATENT DOCUMENTS

| | | | |
|---|---|---|---|
| 2003/0182194 A1* | 9/2003 | Choey et al. | 705/16 |
| 2010/0023455 A1* | 1/2010 | Dispensa et al. | 705/44 |
| 2013/0030925 A1* | 1/2013 | Calman et al. | 705/14.66 |

* cited by examiner

*Primary Examiner* — William Rankins
(74) *Attorney, Agent, or Firm* — Johnson, Marcou & Isaacs, LLC (57) ABSTRACT

When a request to purchase an item using an account of a user is received, a geographic location of a user device when the request was made is determined, the user device used to make the request. If the location from where the request was made is an unexpected location of the user, a determination is made as to the likelihood of the user being at the determined location. The likelihood of the user being at determined location is determined based on social networking information of the user. The purchase request is processed based on the determined likelihood of the user being at the determined location. The feature of checking the location of where a purchase request is made from can be enabled or disabled by the user.

26 Claims, 5 Drawing Sheets

USING LOCATION INFORMATION IN ELECTRONIC COMMERCE

BACKGROUND

1. Field of the Embodiments

The embodiments pertain in general to payment transactions, and more specifically to enabling travelers to complete purchase transactions while traveling.

2. Description of the Related Art

Fraud is a constant problem in electronic commerce. Due to the high volume and impersonal nature of online transactions, it is difficult to detect when a payment instrument such as a credit card is being misused. For example, it is difficult for an online merchant to detect when a stolen credit card is being used to make an online purchase. Fraud is also an ongoing problem in non-electronic commerce (e.g., bricks and mortar retail commerce).

Merchants and financial institutions may attempt to reduce fraud by denying purchase transactions deemed suspicious. However, these attempts can lead to false-positive fraud detections that negatively impact legitimate purchasers. For example, a person who travels from the United States to Europe may find that his European credit card purchase transactions are flagged as fraudulent and denied. In some circumstances the traveler may avoid this problem by notifying financial institutions of his traveling plans. However, most people have multiple payment instruments and notifying each associated financial institution of travel plans can be very inconvenient.

BRIEF SUMMARY

Methods, computer-readable storage devices, and computer systems are described for conducting a purchase transaction. Embodiments of the method comprise receiving a request to purchase an item using an account of a user. A geographic location of a user device when the request was made, the user device used to make the request. If the location from where the request was made is an unexpected location of the user, a determination is made as to the likelihood of the user being at the determined location. The likelihood of the user being at determined location is determined based on social networking information of the user. The purchase request is processed based on the determined likelihood of the user being at the determined location.

Embodiments of the computer-readable storage medium have computer-executable instructions. The computer executable instructions comprise an authorization module adapted to receive a request to purchase an item using an account of a user. The authorization module is further adapted to determine a geographic location of a user device when the request was made, the user device used to make the request. The authorization module determines whether the determined location is an unexpected location of the user. The computer executable instructions further comprise a social module adapted to determine, based on social networking information of the user, a likelihood that the user is at the determined location responsive to the determined location being an unexpected location of the user. The computer executable instructions further comprise a purchase module configured to process the purchase request based on the likelihood that the user is at the determined location.

Embodiments of the computer system comprise a computer processor and a computer-readable storage medium storing computer program modules adapted to execute on the computer processor. The computer program modules comprise an authorization module adapted to receive a request to purchase an item using an account of a user. The authorization module is further adapted to determine a geographic location of a user device when the request was made, the user device used to make the request. The authorization module determines whether the determined location is an unexpected location of the user. The computer program modules further comprise a social module adapted to determine, based on social networking information of the user, a likelihood that the user is at the determined location responsive to the determined location being an unexpected location of the user. The computer program modules further comprise a purchase module configured to process the purchase request based on the likelihood that the user is at the determined location.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
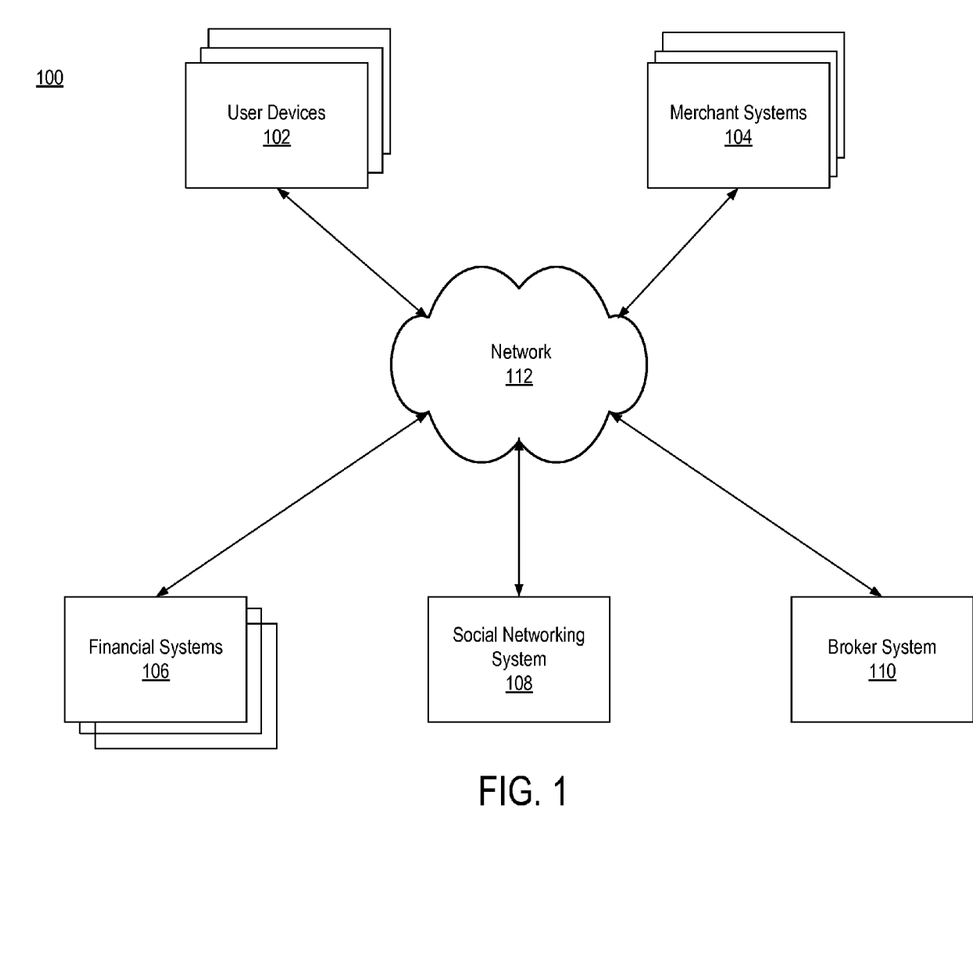
FIG. 1 is a high-level block diagram of a computing environment according to one embodiment.

FIG. 1 is a high-level block diagram of a computing environment 100 according to one embodiment. FIG. 1 illustrates multiple user devices 102, merchant systems 104, financial systems 106, a social networking system 108, and a broker system 110 connected via a network 112. Although the illustrated environment 100 includes only a select number of each entity, other embodiments can include more or less of each entity (e.g., additional social networking systems 108 and broker systems 110).

A user device 102 is an electronic device used by a user to communicate with the entities connected to the network 112. A user device 102 may be, for example, a mobile phone, tablet computer, notebook computer, desktop computer, or personal digital assistant (PDA). In one embodiment, the user devices 102 may connect to the network 112 via wireless or wired connections. In one embodiment, the user devices 102 execute web browsers that allow users to view web pages and other information provided by entities connected to the network 112.

In one embodiment, a user device 102 includes a location detection unit (not shown) that determines the current geographic location of the device 102. The location detection unit may include a Global Positioning System (GPS) receiver that determines the location of the device 102 using GPS satellites. In one embodiment, a user device 102 transmits information about its current location to an entity connected to the network 112 (e.g., the broker system 110) upon the user of the device 102 providing authorization for such transmissions (e.g., via privacy, location, or system settings on the device 102 and/or settings with another system).

A merchant system 104 is an electronic system operated by a merchant that electronically offers items for sale. A merchant system 104 allows a user to search for and view the items offered by its respective merchant. In one embodiment, the merchant systems 104 includes computers operating one or more web servers that provide web pages and other information that allow users of user devices 102 to view the items offered for sale.

In one embodiment, items offered by merchants of the systems 104 include tangible and/or intangible items, such as books, electronic devices, services, and downloadable files. One or more of merchants offer travel items for sale. Travel items allow a person to travel between different geographical locations, such as plane tickets, train tickets, lodging reservations, rental car reservations, and other accommodations. Travel items thus indicate travel to identified geographic locations planned by the purchaser.

In one embodiment, when a user of a user device 102 requests to purchase one or more items from a merchant system 104, the merchant system 104 provides the user with options as to how to pay for the items. In one embodiment, one option is to pay by providing payment information (e.g., credit or debit card number) directly to the merchant system 104. Another option is to pay using the broker system 110.

If the user selects to pay using the broker system 110, the merchant system 104 directs the user device 102 to the broker system 110 for the user to complete the purchase transaction. The merchant system 104 transmits to the broker system 110, transaction information that allows the broker system 110 to complete the purchase transaction. The transaction information may include information of the one or more items being purchased (e.g., price, description of the item) and information of the merchant (e.g., identifier of the merchant).

In another embodiment, when a user of the user device 102 requests to purchase one or more items from a merchant system 104, the merchant system 104 automatically directs the user device 102 to the broker system 110 for completing the transaction. Therefore, in this embodiment, a user can only purchase items using the broker system 110.

In one embodiment, when a user has completed the purchase of an item from a merchant system 104, the merchant system 104 coordinates delivery of the item to the user. If the item is to be shipped, the merchant system 104 coordinates delivery of the item with a shipping company. If the item is an electronic file, the merchant system 104 makes the file electronically available to the user. In one embodiment, if the purchased item is a service, the merchant system 104 provides the user with instructions on how to obtain the service.

A financial system 106 is an electronic system operated by a financial institution that provides financial services. A financial institution may be, for example, a bank or an issuer of a credit card. Users create financial accounts with the financial institutions. One type of financial account that a user may have with a financial institution is an account in which the user may withdraw or deposit funds in the account (e.g., a savings or checking account). Another type of financial institution account that a user may have is a revolving account in which the user is granted a line of credit from which the user can borrow money for paying another entity (e.g., a credit card account).

In one embodiment, when a user having an account with a financial institution requests that payment be provided to a merchant, the system 106 of the financial institution determines whether to authorize the payment. If a determination is made to authorize the payment, the financial system 106 transfers funds to an account of the merchant. If a determination is made to deny the payment, the financial system 106 notifies the user of the denial. In one embodiment, a user with a user device 102 can request payment to a merchant through a merchant system 104 or the broker system 110.

In one embodiment, a financial system 106 may occasionally receive information from the broker system 110 as to the travel plans of a user having an account with the system 106. When the financial system 106 receives the information, the system 106 stores the information for later use in determining whether to authorize certain transactions involving the user's account.

The social networking system 108 is an electronic system operated by a social networking provider. The social networking system 108 stores one or more social networks. Each social network includes multiple users and describes the relationships between the users. Users of the social networking system 108 can establish connections (i.e., relationships) with other users of the system 108 to whom they desire to be connected. The social networking system 108 allows users of system 108 to communicate and interact with each other.

In one embodiment, the social networking system 108 stores a profile for each user of the system 110. A user profile includes information voluntarily provided by the respective user to the social networking system 108 about himself, such as name, biographical information, and hobbies. In one embodiment, a user can post information to his profile for sharing with other connected users. The information may include, for example: a status/stream update, current location of the user, pictures with captions, videos, and content from the Internet (e.g., a news article). Additionally, a user can post information to the profile of a user with which he has a connection. In one embodiment, a user has an option to activate or disable a post location setting with the social networking system 108. If the user activates the post location setting, for each post by the user, the social networking system 108 stores the location from which the user made the post (e.g., for sharing with users with whom have a connection). As described herein, a post is the sharing of specific information with the social networking system 108.

In one embodiment, the social networking system 108 shares social networking information of a user with the broker system 110 upon the user providing the broker system 110 with permission to access the information. The social networking information of a user includes information (e.g., posts) provided to the social networking system 108 by the user and provided by other users with which the user is connected.

The broker system 110 serves as an intermediary for transactions between users and merchant systems 104. In one embodiment, the broker system 110 functions as a centralized place that users can use to pay for items offered by merchants. Thus, users can patronize multiple merchants while providing their payment information only to the broker system 110. In one embodiment, the broker system 110 is independent of the merchant systems 104 in that they are owned and managed by different entities. In another embodiment, the broker system 110 and one or more merchant systems 104 are owned/managed by the same entity.

In one embodiment, when a request is made to purchase an item using a broker account of a user with the broker system 110, the broker system 110 determines the geographic location from where the request was made. If the determined location is a location where the user was not expected (e.g., outside a home area of the user and there is no record of travel plans of the user to the location), the broker system 110 determines a score that represents the likelihood that the user is actually at the location and thus the purchase request is not an attempted fraudulent transaction by another person.

In one embodiment, to determine the score, the broker system 110 analyzes social networking information of the user with the social networking system 108. For example, the broker system 110 may determine the score based on one or more of the following: whether the user indicated she is near the location, uploaded or was tagged in a picture near the location, or posted about the location. If the user, for example, just indicated to the social networking system 108 that she is at the determined location, it is very likely that the user made the purchase request.

In one embodiment, if based on the score a determination is made that the user is likely not at the location, the broker system 110 declines to proceed with the purchase transaction. On the other hand, if a determination is made that the user is likely at the location, the broker system 110 proceeds with completing the purchase transaction of the item. In one embodiment, this feature of checking the location of where a purchase request is made from in order to determine whether to process the request can be enabled or disabled by the user of the account via settings with broker system 110.

In one embodiment, if a user completes a purchase transaction for a travel item using the system 110, with the user's permission, the broker system 110 notifies the financial systems 106 of institutions with which the user has an account of the user's travel plans associated with the purchased travel item. As an example, assume a user lives in New York and purchases from a merchant using the broker system 110, a round trip plane ticket from New York to Munich, Germany. The user is to leave for Munich on October $20^{th}$ and return on October $30^{th}$. In response to the purchase, the broker system 110 notifies the user's banks and credit card companies that the user will be in Munich between October $20^{th}$ and October $30^{th}$. The notification enables the financial institutions to use the provided travel information when determining whether to approve purchase transactions attempted by the user while traveling. Thus, the user does not need to take any additional steps to notify the financial institutions of the user's traveling plans, and the risk of false positive fraud detections for the user's purchases made while in Munich is reduced.

The network 112 represents the communication pathways among the entities connected to the network. In one embodiment, the network 112 is the Internet and uses standard communications technologies and/or protocols. Thus, the network 112 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. In another embodiment, the entities can use custom and/or dedicated data communications technologies instead of, or in addition to, the ones described above.

Figure 2:
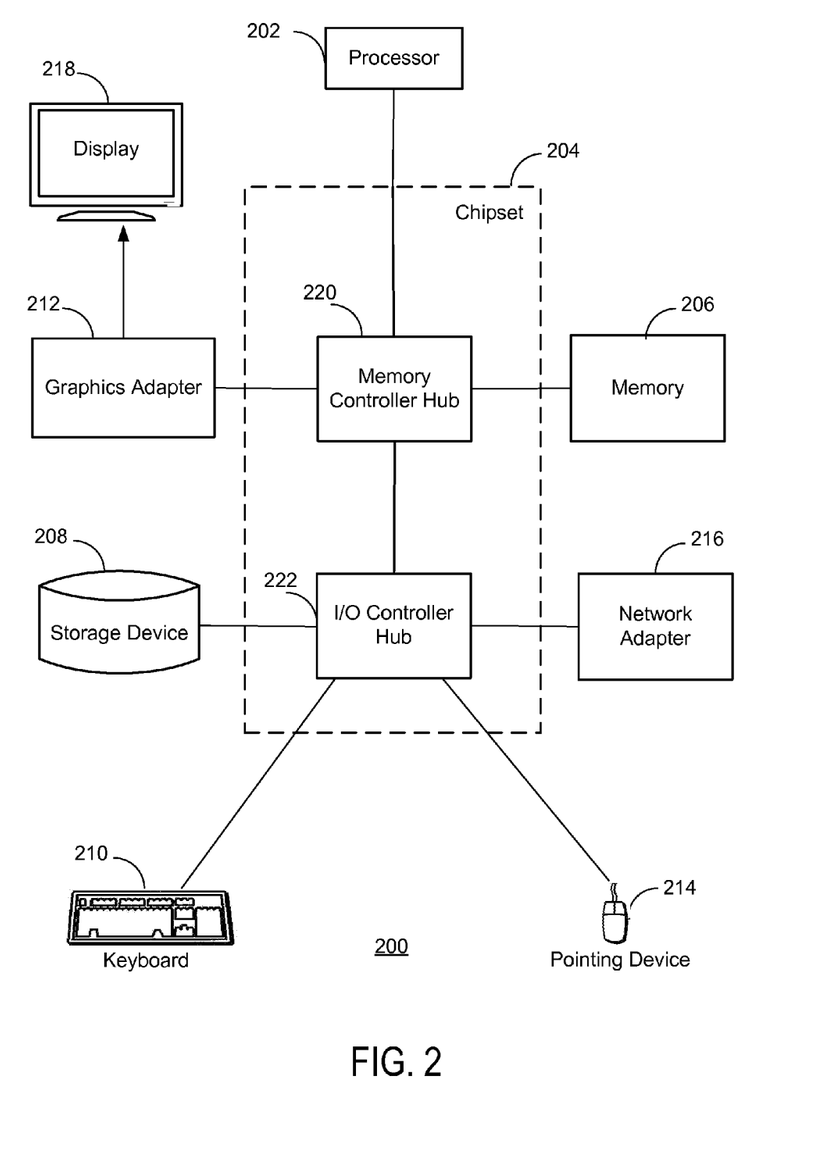
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 112. Some embodiments of the computer system 200 have different and/or other components than those shown in FIG. 2.

The computer 200 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 208, loaded into the memory 206, and executed by the processor 202.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 200 used by the entities of FIG. 1 can vary depending upon the embodiment and the processing power used by the entity. For example, a user device 102 that is a mobile phone typically has limited processing power, a small display 218, and might lack a pointing device 214. The broker system 110 and financial systems 106, in contrast, may comprise multiple blade servers working together to provide the functionality described herein.

Figure 3:
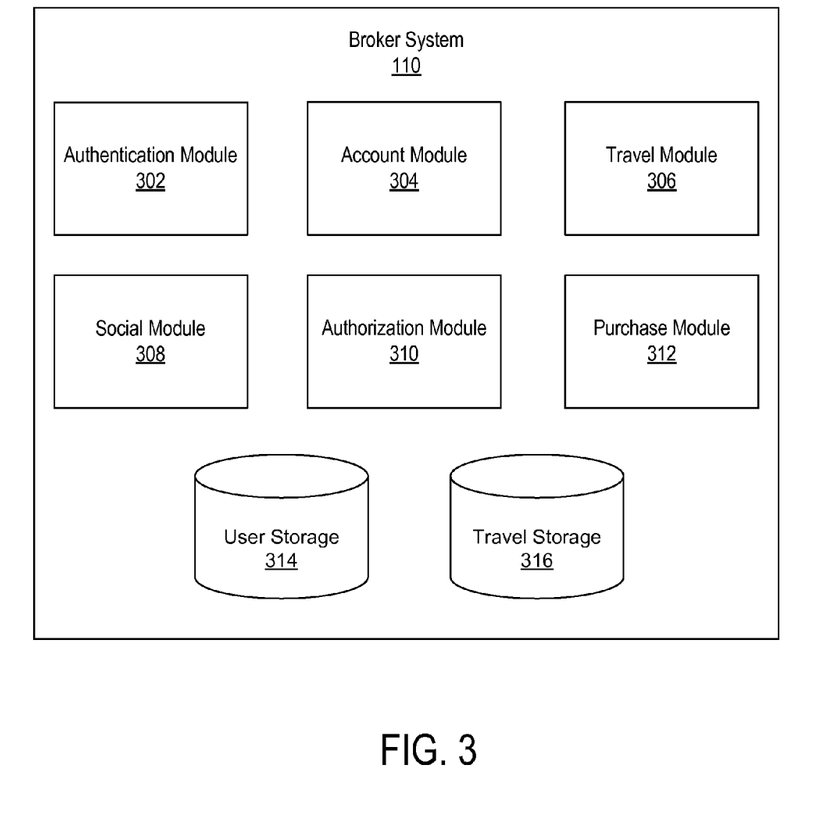
FIG. 3 is a high-level block diagram illustrating modules within a broker system according to one embodiment.

FIG. 3 is a high-level block diagram illustrating modules within the broker system 110 according to one embodiment. Those of skill in the art will recognize that other embodiments can have different and/or other modules than the ones described here, and that the functionalities can be distributed among the modules in a different manner.

An authentication module 302 authenticates users of the broker system 110. In one embodiment, the authentication module 302 maintains in a user storage 314 authentication information for each user that has created a broker account with the broker system 110 (e.g., signed up) in order to use the services provided by the broker system 110. In one embodiment, the authentication information includes a user identifier and a password.

In one embodiment, when a user attempts to communicate with the broker system 110 and the user is not logged into the system 110, the authentication module 302 communicates with the device 102 of the user so that the user can provide his respective authentication information and be logged into the broker system 110. In another embodiment, the user is automatically logged into the system 110 by the device 102.

In one embodiment, if a user has not previously signed up with the system 110 and requests to create a broker account, the user goes through a sign up process in order to create the broker account with the broker system 110. In the sign up process, the user provides authentication information that user wishes to use to login, as well as personal information (e.g., name, email address, phone number).

In one embodiment, in the sign up process, the user has the option to provide financial account information describing one or more financial accounts that the user has with financial institutions. The financial account information provided for a financial institution account may include one or more of the following: the name of the financial institution (e.g., name of bank), a routing transit number of the institution, a type of the account, an account number, a personal identification number, a credit card number, and an expiration date of a credit card.

The authentication module 302 stores the received financial account information in the user storage 314. One reason that a user may provide financial account information is so that that it can be easily accessible to the user and can expedite future purchases by the user. Another reason that a user may provide financial account information is so that when the user purchases a travel item using the broker system 110, the system 110 can notify the respective financial institutions of the user's travel plans.

In one embodiment, in the sign up process the user has the option to provide the broker system 110 with authorization to monitor travel plans of the user based on purchases of travel items. In one embodiment, in the sign up process the user has the option to provide the broker system 110 with authorization to monitor the current location of the user's device 102 and/or to access the user's social networking information from the social networking system 108 for verifying that purchase requests are made by the user. In one embodiment, for accessing the user's social information, the user provides authentication information (e.g., user identifier and password) of the user with the social networking system 108. The authentication information is stored by the authentication module 302 in the user storage 314.

An account module 304 maintains the balances of broker accounts of users with the broker system 110. In one embodiment, users of the broker system 110 can maintain a balance with their broker account for purchasing items. A user can increase the balance of his broker account by depositing funds in the account. In one embodiment, if a user requests to transfer funds from a financial institution account to his broker account, the account module 304 communicates with the financial system 106 of the institution to complete the transfer. Once the transfer is complete, the account module 304 updates the balance of the user's broker account to reflect the transfer/deposit. In one embodiment, if the broker system 110 completes a purchase transaction for a user using the user's broker account balance, the purchase module 312 updates the balance to reflect the purchase.

A travel module 306 notifies financial institutions of travel plans of users. In one embodiment, the travel module 306 monitors for a purchase module 312 completing a user's purchase of a travel item. As described above, travel items allow a person to travel between different geographical locations, such as plane tickets, train tickets, lodging reservations, and rental car reservations.

In one embodiment, when a user purchases a travel item, the travel module 306 transmits information of the travel item to the systems 106 of one or more financial institutions with which the user has a financial account. The travel information is transmitted in order to notify the institutions of the user's travel plans. The transmitted travel information may include, for example, travel dates, travel times, and travel locations.

In one embodiment, the travel information is automatically transmitted to each institution for which financial account information is stored in the user storage 314 for the user. In one embodiment, the user indicates to which financial institutions to transmit the travel information. In one embodiment, the travel module 306 also stores the travel information of a purchased travel item in a travel storage 316.

A social module 308 determines a likelihood that a user is at a certain location. When the social module 308 receives a request that a determination be made as to whether a user is at a certain geographical location, the social module 308 calculates a score. The score represents the likelihood that the user is at the location.

In one embodiment, the social module 308 calculates the score based on social networking information of the user with the social networking system 108. In one embodiment, the social module 308 also uses social networking information of the other users connected to the user to calculate the score. In one embodiment, the social module 308 uses a statistical model to calculate the score based on the social networking information. In one embodiment, the statistical model is a machine learned model.

In one embodiment, the social module 308 calculates the score by searching the social networking information for factors that indicate the location of the user. In one embodiment, the social module 308 searches the social information for one or more of the following factors: whether the user or a connected user indicated he or she is near the location, posted about the location (e.g., status update regarding the location), posted near the location, posted a picture or video of the location, and shared an Internet article about the location. Each factor may contribute zero, positive, or negative amount of points to the score based on whether or not the factor is present within the social networking information.

For example, if the user indicated to the social networking system 108 that she is at or near the location, the factor may contribute 10 points to the score and if a connected user posted about the location it contributes one point to the score. In one embodiment, a system administrator sets the amount of points that each factor contributes to a score. The social module 308 calculates the score by summing the points determined by searching the social networking information for the factors.

In other embodiments, the social module 308 may calculate the score based on information other than social networking information. In one embodiment, the social module 308 may also calculate the score based on the user's web browsing history (e.g., any views of web pages related to the geographic location), search engine search history (e.g., searches related to the location), and/or application usage history (e.g., using a mapping service application to identify the location in a map).

In situations in which the social module 308 and other modules or entities discussed herein collect personal information about users, or may make use of personal information, the users may be provided with an opportunity to control whether and how the information is collected. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information about the user is collected and used.

An authorization module 310 determines whether to authorize the processing of purchase requests. When a person requests to purchase one or more items from a merchant system 104 using a user's broker account with a broker system 110, the authorization module 310 determines the geographic location from where the person made the request (i.e., location where the request originated). In one embodiment, the authorization module 310 determines the request location using information provided by the device 102 used to make the request. In one embodiment, when making the request, the device 102 provides its location (e.g., location determined by a location detection unit of the device 102). In one embodiment, the authorization module 310 determines the location based on an Internet Protocol (IP) address of the device 102.

Once the location from where the request was made is determined, the authorization module 310 determines whether the location is a location where the user of the account is expected to be found (i.e., whether the location is an expected location of the user). In one embodiment, the determined location is an expected location if it is within a certain radius of the user's home address (e.g., 100 miles). In one embodiment, the determined location is an expected location if travel information stored in the travel storage 316 indicates that the user is currently traveling near the determined location.

In one embodiment, if the determined location is an expected location of the user, the authorization module 310 authorizes the purchase of the items and a purchase module 312 can proceed with completing the purchase transaction. However, if the determined location is not a location where the user is expected to be found, the authorization module 310 requests that the social module 308 calculate a score that represents the likelihood that the user is at the determined location.

If the score calculated by the social module 308 is above a threshold, the authorization module 310 determines that the person that made the purchase request is likely the user of the broker system account. The authorization module 310 authorizes the purchase of the items. On the other hand, if the calculated score is below the threshold, the authorization module 310 determines that the person that made the request is likely not the user of the account and declines the purchase request. Thus, if a person steals a user's authentication information and accesses the user's broker account from an unexpected and unlikely location, the authorization module 310 will not allow the person to make a purchase.

In another embodiment, if the purchase will be made using funds from a financial institution, regardless of whether the determined location is an expected location or a score determined by the social module 308, the authorization module 310 authorizes the purchase and the purchase module 312 can proceed with completing the purchase transaction. However, when the purchase module 312 communicates with a financial system 106 of the institution to seek approval for making the purchase using funds from the institution, the determination by the authorization module 310 as to whether the user is at the location is provided to the financial system 106. The determination by the authorization module 310 is provided as a recommendation as to whether the financial system 106 should approve the purchase.

For example, if the determined location is an expected location or a score calculated by the social module 308 for the location is above a threshold, a recommendation is provided to the financial system 106 that it approve the purchase using funds from the institution. However, if the determined location is not an expected location and a calculated score is below the threshold, a recommendation is provided to the financial system 106 that it decline the purchase. Thus, in this embodiment, the financial institution ultimately makes the decision as to whether to approve the purchase.

The purchase module 312 processes purchase requests. In one embodiment, when a user requests to purchase one or more items from a merchant system 104 using the broker system 110 and the authorization module 310 has authorized proceeding with completing the purchase request, the purchase module 312 communicates with the device 102 of the user to complete the purchase transaction.

In one embodiment, the purchase module 312 requests and receives from the user delivery information for the items. The requested delivery information may include the type of delivery the user desires (e.g., electronic or via a shipping company), a delivery address (e.g., email address or shipping address), and a delivery speed (e.g. overnight shipping or standard ground shipping).

The purchase module 312 calculates a grand total for the purchase transaction while taking into account the delivery information received. In one embodiment, the purchase module 312 calculates the grand total by summing the cost of the items being purchased, applicable delivery costs (e.g., shipping cost to user's home), and applicable taxes to the transaction. In one embodiment, in calculating the grant total, the purchase module 312 includes a service charge charged by the broker system 110 for processing the purchase transaction. The grand total is displayed to the user via the user device 102.

The purchase module 312 requests from the user information as to how the user desires pay for the purchase of the items. In one embodiment, a user can select to pay using a financial account with a financial institution (e.g., credit card, debit card or checking account). If the user selects to pay using a financial account, the purchase module 312 communicates with the respective financial system 106 in order to seek approval for payment using the account. If the financial system 106 approves the transaction, the purchase module 312 notifies the user that the purchase transaction is complete and provides a receipt. If the financial system 106 declines the transaction, the purchase module 312 notifies the user that the purchase transaction has been declined.

In one embodiment, if the user has a balance in his broker account with the broker system 110 and the balance is greater than or equal to the grand total of the purchase transaction, the user can select to pay for the items using the balance. If the user selects to pay using the balance, the purchase module 312 notifies the user that the purchase transaction is complete and the account module 304 updates the balance based on the purchase.

Once the purchase transaction is complete, the purchase module 312 notifies the merchant system 104 of the completion of the purchase. In one embodiment, the purchase module 312 transmits to the merchant system 104 delivery information provided by the user. In one embodiment, purchase module 312 coordinates transfer of funds to the merchant based on the purchase transaction.

Figure 4A:
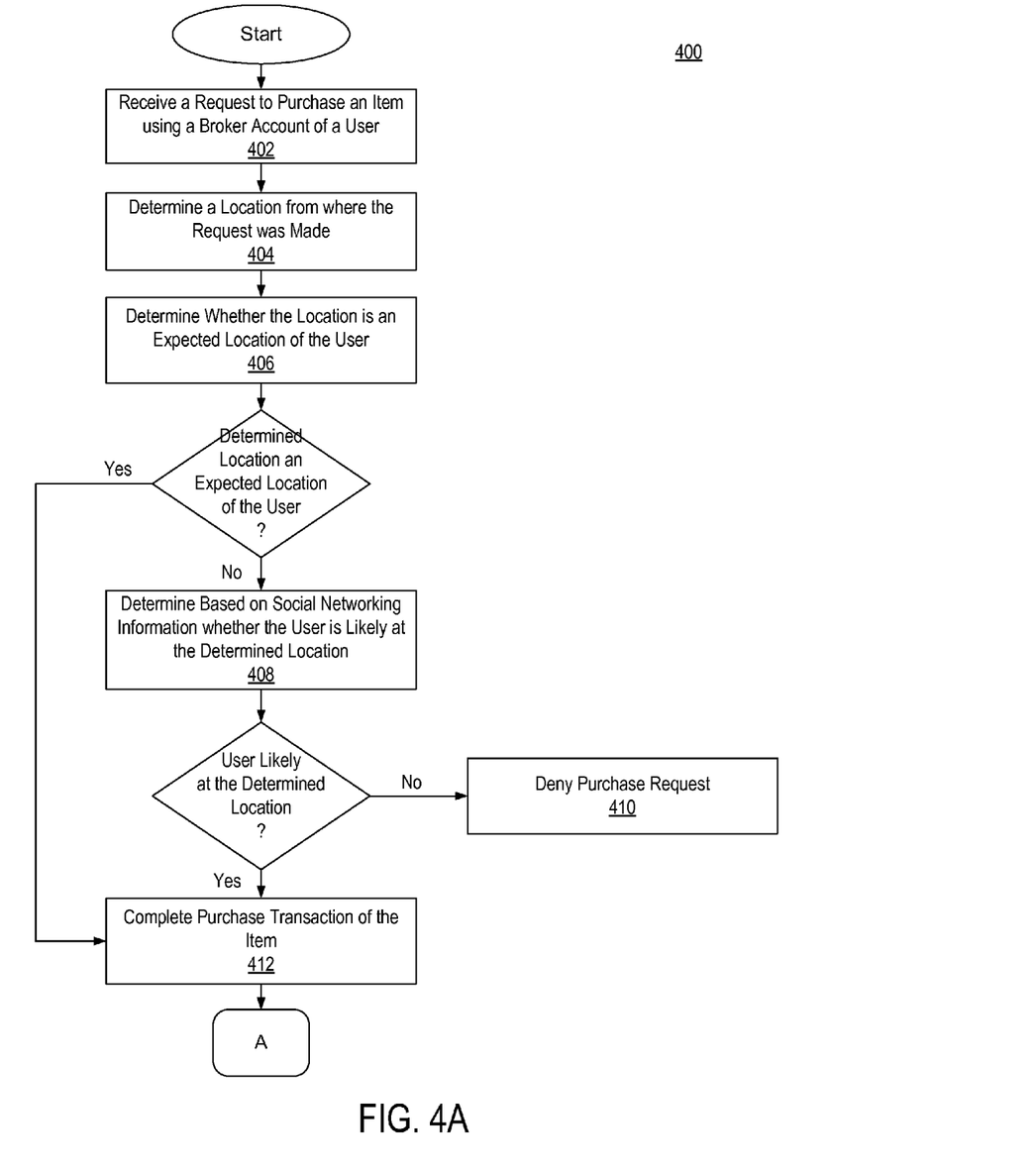
FIGS. 4A and 4B include a flow chart illustrating the operations of the broker system in processing a purchase request according to one embodiment.
Figure 4B:
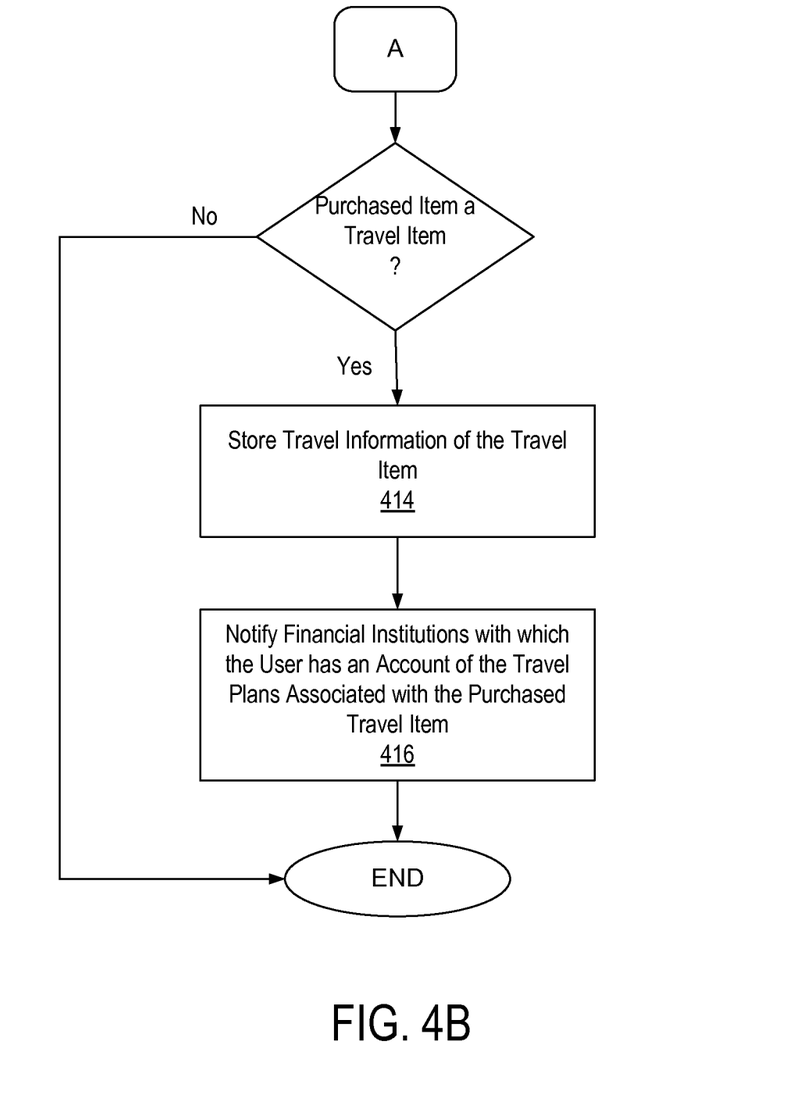

FIGS. 4A and 4B include a flow chart 400 illustrating the operations of the broker system 110 in processing a purchase request according to one embodiment. Those of skill in the art will recognize that other embodiments can perform the steps of FIGS. 4A and 4B in different orders. Moreover, other embodiments can include different and/or additional steps than the ones described here.

In FIG. 4A, the broker system 110 receives 402 a request to purchase an item using a broker account of a user. The broker system 110 determines 404 a location from where the request was made and determines 406 whether the determined location is a location where the user is expected to be found (i.e., is the location an expected location or an unexpected location). In one embodiment, the broker system 110 takes into account stored information on travel plans of the user in determining whether the determined location is an expected location.

If the determined location is an unexpected location of the user, the broker system 110 determines 408 whether it is likely that the user is at the determined location based on social networking information of the user from the social networking system 108. In one embodiment, the broker system 110 determines whether it is likely that the user is at the determined location by calculating a score that represents the likelihood that the user is at the location. The score is calculated based on the social networking information.

The broker system 110 selectively processes the purchase request based at least in part on the likelihood that the user is at the determined location. If it is unlikely that the user is at the determined location, the broker system 110 denies 410 the purchase request. On the other hand, if it is likely that the user is at the determined location, the broker system 110 completes 412 the purchase transaction of the item.

In FIG. 4B, if the purchased item is a travel item, the broker system 110 stores 414 travel information of the travel item. The travel information is used for future purchase transactions in determining the expected location of the user. The broker system 110 also identifies the financial institutions with which the user is associated (e.g., with which the user has an account) and notifies 416 the financial institutions of the travel plans of the user indicated by the travel information of the travel item.

In situations in which the systems discussed here collect personal information about users, or may make use of personal information, the users may be provided with an opportunity to control whether programs or features collect user information (e.g., information about a user's social network, social actions or activities, or a user's current location). In addition, certain data may be treated in one or more ways before it is stored or used, so that personally identifiable information is removed. For example, a user's identity may be treated so that no personally identifiable information can be determined for the user or a user's geographic location may be generalized where location information is obtained (such as to a city, ZIP code, or state level), so that a particular location of a user cannot be determined. Thus, the user may have control over how information is collected about the user and used by a system.

Some portions of above description present the features of present embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by real time network operating systems.

The disclosure of the embodiments is intended to be illustrative, but not limiting, of the full scope of the embodiments, which are set forth in the following claims.

The invention claimed is:

1. A computer-implemented method for conducting a purchase transaction, comprising:
   receiving, using one or more computing devices, a request to purchase an item using a user device associated with an account of a user;
   determining, using the one or more computing devices, a geographic location of the user device when the request to purchase was made;
   determining, using the one or more computing devices, whether the location of the user device when the request was made is an unexpected location of the user;
   responsive, using the one or more computing devices, to the determined location being an unexpected location of the user, calculating a score based on social networking information of the user, the score representing a likelihood of the user being at the determined location;
   responsive to the score being above a threshold, determining that the user is likely at the determined location; and
   based at least on the determination that the user is likely at the determined location, processing, using the one or more computing devices, the purchase request.

2. The method of claim 1, wherein determining whether the location of the user device when the request was made is an unexpected location comprises:
   accessing stored travel information for the user, the stored travel information indicating a location to which the user plans to travel; and
   determining whether the location of the user device when the request was made is the location to which the stored travel information indicates the user plans to travel.

3. The method of claim 1, further comprising:
   conducting a purchase transaction with the user for a travel item, the travel item indicating a geographic location to which the user plans to travel; and
   storing travel information indicating the geographic location to which the user plans to travel;
   wherein determining whether the location of the user device when the request was made is an unexpected location comprises determining whether the location of the user device when the request was made is the location to which the stored travel information indicates the user plans to travel.

4. The method of claim 1, wherein calculating the score comprises analyzing information provided by the user to the social networking system to determine whether the information indicates that the user is at or near the determined geographic location from where the request was made.

5. A computer-implemented method for conducting a purchase transaction, comprising:
   receiving, using one or more computing devices, a request to purchase an item using a user device associated with an account of a user, wherein the item is a travel item indicating that the user plans to travel to a geographic location;
   determining, using the one or more computing devices, a geographic location of the user device when the request to purchase was made;

determining, using the one or more computing devices, whether the location of the user device when the request was made is an unexpected location of the user;

responsive, using the one or more computing devices, to the determined location being an unexpected location of the user, determining based on social networking information of the user, a likelihood that the user is at the determined location;

based at least on the determined likelihood that the user is at the determined location, processing, using the one or more computing devices, the purchase request for the travel item;

identifying, using the one or more computing devices, a plurality of financial institutions associated with the user; and notifying, using the one or more computing devices, the plurality of financial institutions associated with the user of the user's plans to travel to the geographic location.

6. The method of claim 5, wherein determining whether the location of the user device when the request was made is an unexpected location comprises:

accessing stored travel information for the user, the stored travel information indicating a location to which the user plans to travel; and determining whether the location of the user device when the request was made is the location to which the stored travel information indicates the user plans to travel.

7. The method of claim 5, further comprising storing travel information indicating the geographic location to which the user plans to travel, wherein determining whether the location of the user device when the request was made is an unexpected location comprises determining whether the location of the user device when the request was made is the location to which the stored travel information indicates the user plans to travel.

8. The method of claim 5, wherein determining a likelihood that the user is at the determined location comprises calculating a score based on the social networking information, the score representing the likelihood of the user being at the determined location and further comprising, responsive to the score being above a threshold, determining that the user is likely at the determined location.

9. The method of claim 8, wherein calculating the score comprises analyzing information provided by the user to the social networking system to determine whether the information indicates that the user is at or near the determined geographic location from where the request was made.

10. A computer program product, comprising:

a non-transitory computer-readable medium having computer-readable program instructions embodied thereon that when executed by a computer cause the computer to conduct a purchase transaction, the computer-readable program instructions comprising:

computer-readable program instructions to receive a request to purchase an item using a user device associated with an account of a user;

computer-readable program instructions to determine a geographic location of the user device when the request to purchase was made;

computer-readable program instructions to determine whether the location of the user device when the request was made is an unexpected location of the user;

computer-readable program instructions, responsive to the determined location being an unexpected location of the user, to calculate a score based on social networking information, the score representing a likelihood of the user being at the determined location;

computer-readable program instructions to determine that the user is likely at the determined location responsive to the score being above a threshold; and computer-readable program instructions to process the purchase request based at least on the determined likelihood that the user is at the determined location.

11. The computer program product of claim 10, further comprising:

computer-readable program instructions to access stored travel information for the user, the stored travel information indicating a location to which the user plans to travel; and computer-readable program instructions to determine whether the location of the user device when the request was made is the location to which the stored travel information indicates the user plans to travel.

12. The computer program product of claim 10, further comprising:

computer-readable program instructions to conduct a purchase transaction with the user for a travel item, the travel item indicating a geographic location to which the user plans to travel; and computer-readable program instructions to store travel information indicating the geographic location to which the user plans to travel, wherein determining whether the location of the user device when the request was made is an unexpected location comprises determining whether the location of the user device when the request was made is the location to which the stored travel information indicates the user plans to travel.

13. The computer program product of claim 10, further comprising computer-readable program instructions to analyze information provided by the user to the social networking system to determine whether the information indicates that the user is at or near the determined geographic location from where the request was made.

14. A computer program product, comprising:

a non-transitory computer-readable medium having computer-readable program instructions embodied thereon that when executed by a computer cause the computer to conduct a purchase transaction, the computer-readable program instructions comprising:

computer-readable program instructions to receive a request to purchase an item using a user device associated with an account of a user, wherein the item is a travel item indicating that the user plans to travel to a geographic location;

computer-readable program instructions to determine a geographic location of the user device when the request to purchase was made;

computer-readable program instructions to determine whether the location of the user device when the request was made is an unexpected location of the user;

computer-readable program instructions, responsive to the determined location being an unexpected location of the user, to calculate a score based on social networking information, the score representing a likelihood of the user being at the determined location;

computer-readable program instructions to determine that the user is likely at the determined location responsive to the score being above a threshold; and computer-readable program instructions to process the purchase request for the travel item based at least on the determined likelihood that the user is at the determined location;

computer-readable program instructions to identify a plurality of financial institutions associated with the user; and computer-readable program instructions to notify the plurality of financial institutions associated with the user of the user's plans to travel to the geographic location.

15. The computer program product of claim 14, wherein determining whether the location of the user device when the request was made is an unexpected location comprises:

accessing stored travel information for the user, the stored travel information indicating a location to which the user plans to travel; and determining whether the location of the user device when the request was made is the location to which the stored travel information indicates the user plans to travel.

16. The computer program product of claim 14, further comprising computer-readable program instructions to store travel information indicating the geographic location to which the user plans to travel, wherein determining whether the location of the user device when the request was made is an unexpected location comprises determining whether the location of the user device when the request was made is the location to which the stored travel information indicates the user plans to travel.

17. The computer program product of claim 14, wherein determining a likelihood that the user is at the determined location comprises calculating a score based on the social networking information, the score representing the likelihood of the user being at the determined location and further comprising, responsive to the score being above a threshold, determining that the user is likely at the determined location.

18. The computer program product of claim 16, wherein calculating the score comprises analyzing information provided by the user to the social networking system to determine whether the information indicates that the user is at or near the determined geographic location from where the request was made.

19. A computer system for conducting a purchase transaction, comprising:

a computer processor; and a computer-readable storage device storing computer program modules adapted to execute on the computer processor, the computer program modules comprising:

an authorization module adapted to:

receive a request to purchase an item using a user device associated with an account of a user;

determine a geographic location of the user device when the request to purchase was made;

determine whether the location of the user device when the request was made is an unexpected location of the user;

a social module adapted to calculate a score based on social networking information, the score representing a likelihood of the user being at the determined location;

the authorization module further adapted to determine that the user is likely at the determined location responsive to the score being above a threshold; and a purchase module adapted to process the purchase request based at least on the determined likelihood that the user is at the determined location.

20. The system of claim 19:

the purchase module further adapted to conduct a purchase transaction with the user for a travel item, the travel item indicating a geographic location to which the user plans to travel; and a travel module adapted to store travel information indicating the geographic location to which the user plans to travel, wherein determining whether the location of the user device when the request was made is an unexpected location comprises determining whether the location of the user device when the request was made is the location to which the stored travel information indicates the user plans to travel.

21. The system of claim 19, wherein the social module is further adapted to analyze information provided by the user to the social networking system to determine whether the information indicates that the user is at or near the determined geographic location from where the request was made.

22. A computer system for conducting a purchase transaction, comprising:

a computer processor; and a computer-readable storage device storing computer program modules adapted to execute on the computer processor, the computer program modules comprising:

an authorization module adapted to:

receive a request to purchase an item using a user device associated with an account of a user, wherein the item is a travel item indicating that the user plans to travel to a geographic location;

determine a geographic location of the user device when the request to purchase was made;

determine whether the location of the user device when the request was made is an unexpected location of the user;

a social module adapted to determine, based on social networking information of the user, a likelihood that the user is at the determined location responsive to the determined location being an unexpected location of the user;

a purchase module adapted to process the purchase request for the travel item based at least on the determined likelihood that the user is at the determined location; and a travel module adapted to:

identify a plurality of financial institutions associated with the user; and notify the plurality of financial institutions associated with the user of the user's plans to travel to the geographic location.

23. The system of claim 22, wherein determining whether the location of the user device when the request was made is an unexpected location comprises:

accessing stored travel information for the user, the stored travel information indicating a location to which the user plans to travel; and determining whether the location of the user device when the request was made is the location to which the stored travel information indicates the user plans to travel.

24. The system of claim 22, wherein the travel module is further adapted to store travel information indicating the geographic location to which the user plans to travel, wherein determining whether the location of the user device when the request was made is an unexpected location comprises determining whether the location of the user device when the request was made is the location to which the stored travel information indicates the user plans to travel.

25. The system of claim 22, wherein determining a likelihood that the user is at the determined location comprises calculating a score based on the social networking information, the score representing the likelihood of the user being at the determined location and wherein the social module, responsive to the score being above a threshold, is further adapted to determine that the user is likely at the determined location.

26. The system of claim 25, wherein calculating the score comprises analyzing information provided by the user to the social networking system to determine whether the information indicates that the user is at or near the determined geographic location from where the request was made.

* * * * *